April 1, 1947.    C. M. KEARNS    2,418,352
ADJUSTABLE WHEELED CULTIVATOR
Filed June 14, 1944    2 Sheets-Sheet 1

INVENTOR.
Charles M. Kearns,
BY
Victor J. Evans & Co.
ATTORNEYS

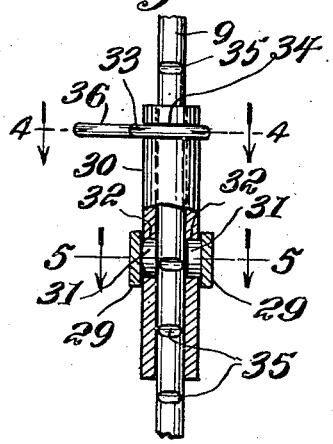
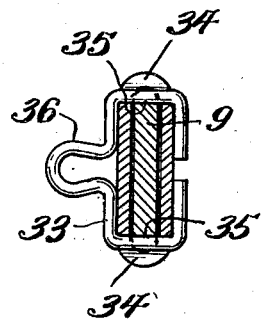
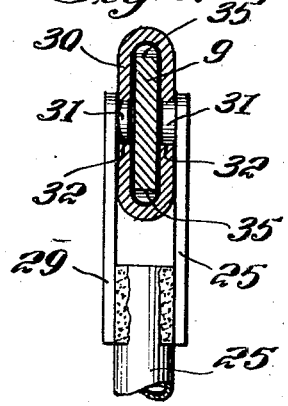
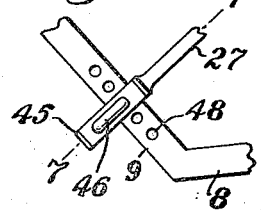
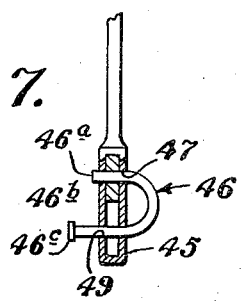

Patented Apr. 1, 1947

2,418,352

UNITED STATES PATENT OFFICE 2,418,352

ADJUSTABLE WHEELED CULTIVATOR

Charles M. Kearns, Beavertown, Pa.

Application June 14, 1944, Serial No. 540,341

5 Claims. (Cl. 97—59)

This invention relates to agricultural implements and more particularly to a hand plow or cultivator of the type used for preparing and tending gardens.

It is one object of the invention to provide a machine of this character wherein the frame is of such formation and the handles so connected with the frame that they may be shifted to vertically adjusted positions and thus allow the machine to be very easily pushed forwardly across a field or garden plot with the blades entering the ground to a desired depth.

Another object of the invention is to so mount a bracket carrying the handles that while it may be easily shifted along a diagonally extending portion of the frame it will not be liable to accidently slip out of a position of adjustment when pushing force is applied to the handles.

Another object of the invention is to so mount the handle that it may be tilted vertically to an angle most convenient to the person using the implement and also allow the handles to be swung upwardly to a substantially vertical position where it will remain until manually swung downwardly into position for use.

Another object of the invention is to so form and mount the frame that it may be swung about the axle of the wheel to an inverted position presenting the blades upwardly instead of downwardly and thus allow the implement to be wheeled to or away from a place of use without interference by the blades dragging upon the ground.

Another object of the invention is to provide the frame with blade holding means of such construction that blades of various types may be easily applied or removed and when in place shifted transversely of the frame to adjusted positions in which the effective width of the machine will be regulated.

Another object of the invention is to provide the machine with a wheel which is of simple but strong construction and having spokes which are so interlocked with each other that they prevent the spokes from shifting transversely of each other and the wheel weakened when subjected to transverse strains.

Another object of the invention is to provide the handle bars with hand grips so formed and mounted that they may turn about portions of the handle bars to which they are applied and thus prevent a person's hands from becoming rubbed and blisters formed when operating the implement.

The invention is illustrated in the accompanying drawings, wherein:

Figure 3 is a fragmentary view showing the mounting for the handle bars partially in elevation and partially in section.

Figure 4 is a transverse sectional view taken along the line 4—4 of Figure 3.

Figure 5 is a sectional view taken along the line 5—5 of Figure 3.

Figure 6 is a detail view of a modified form of the means for connecting the handle to the inclined arms of the frame, and Figure 7 is a section on the line 7—7 of Figure 6.

Figure 1:
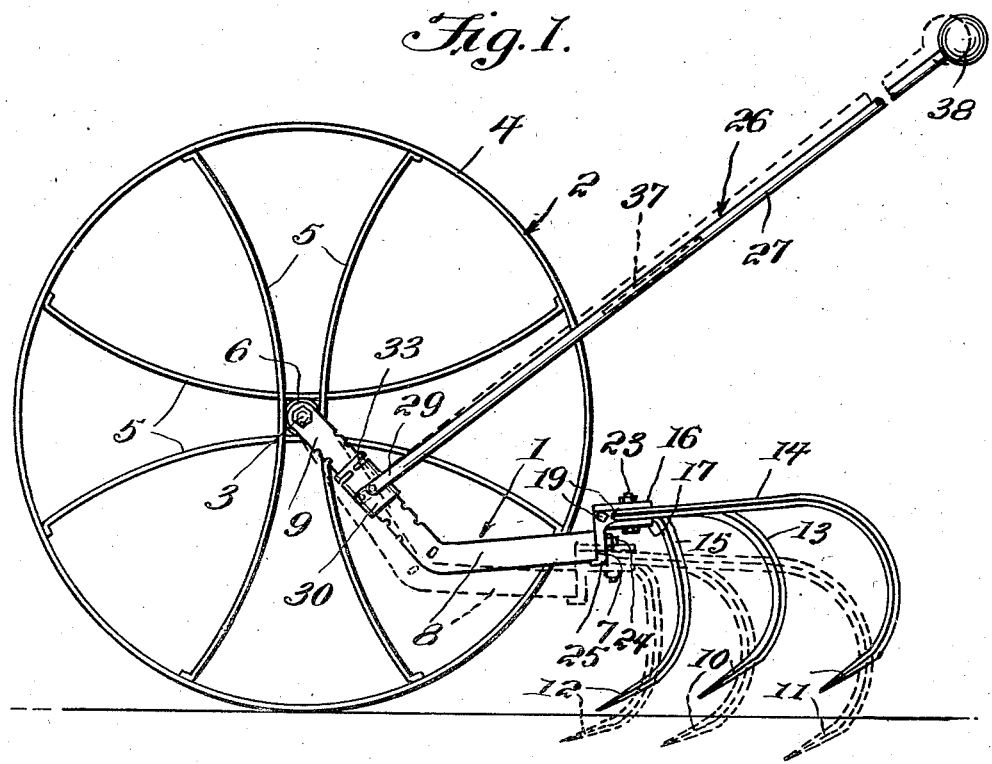
Figure 1 is a side elevation of the improved implement.
Figure 2:
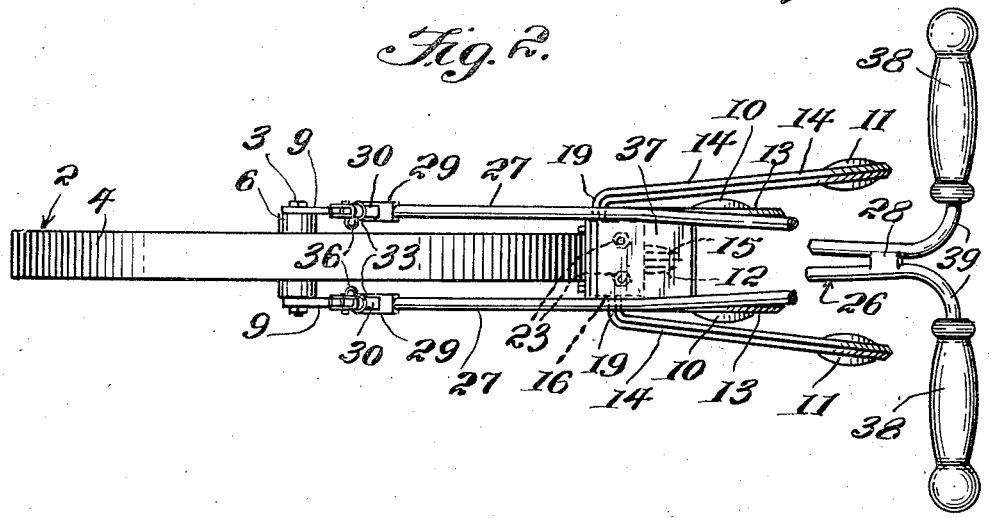
Figure 2 is a top plan view of the implement.

This improved agricultural machine is of the type known as a wheeled plow or cultivator and has a frame indicated in general by the numeral 1 and a wheel 2, the frame being pivoted to the axle 3 of the wheel so that the frame may be tilted about the wheel from a lowered position rearwardly thereof for use to a raised and inverted position in which the implement may be moved from one place to another without interference by its blades engaging the ground.

The wheel has the usual rim 4 and a series of spokes 5 formed from strips of strong metal. These strips are curved longitudinally and each strip forms a pair of opposed spokes extending from opposite sides of the hub 6 of the wheel. Certain of the strips extend in crossed relation to other strips and midportions of the strips are formed with transversely extending slots which register so that the crossed strips may be interengaged with each other and the strips then welded to each other and to the hub. It will thus be seen that a very strong wheel will be formed which is of light weight and capable of withstanding transverse strains without the spokes being bent out of shape or wrenched loose from the hub.

The frame is formed from a metal bar bent to provide a bridge 7 and draft bars 8 which project forwardly from the bridge at opposite sides of the wheel and have their forward portions 9 bent so that when the frame is in its normal position for use of the implement, they project upwardly at a forward incline, as shown in Figure 1. At their front ends the draft bars are formed with openings to receive the axle and pivotally connect the frame with the axle.

At the rear of the frame are mounted blades or shovels 10 and 11 which may be referred to as inner and outer side blades, and in addition a center blade 12, the blade 12 being directly back of the frame and the blades 10 and 11 at opposite sides thereof with blades 11 rearwardly of blades 10 and rearwardly thereof. It will thus be seen that the blades are disposed in positions customarily occupied by the blades of a cultivator and that ground between rows of growing plants may be broken up when the implement is pushed forwardly across a field. The shanks 13, 14 and 15 of the shovels or blades extend forwardly and their forward portions are gripped between clamping plates 16 and 17, the shanks 13 and 14 having their forward portions bent to form inwardly extending arms 18 and 19 which engage the grooves or seats 20 and 21 formed in the upper face of the lower clamping plate 17 and the shank 15 being straight throughout its length and engaged in a groove or seat 22 formed longitudinally of the lower clamping plate and in crossed relation to the seat 20. The shanks are rectangular in cross section and the grooves or seats V-shaped in cross section and when the bolts 23 are tightened the arms of shanks 13 and 14 and the forward portion of shank 15 will be firmly gripped between the plates and held in adjusted positions with the blades spaced rearwardly from the frame and each other predetermined distance. By loosening the bolts the arms may be shifted transversely of the frame and the plates may be shifted from their normal position so that the blades 10 and 11 may be transversely adjusted so that the implement will act upon a desired width of ground and the machine accommodate itself to the distance between rows of growing plants. The blades are disposed at a downward incline towards their front ends and when the implement is in use and pushed forwardly they enter the ground at an incline and break up the soil. Since the lower plate is secured to the bridge by bolts 24 passing through its depending flange 25 the plate or bracket and a set of blades carried thereby may be removed as a unit and a set of blades of another type substituted when so desired.

In order to push the implement forwardly there has been provided a handle 26 formed of two bars 27 which are welded together near their rear or upper ends, as shown at 28, and diverge towards their lower or front end. The bars 27 straddle the wheel and at their front ends carry forks 29 which project forwardly for straddling sleeves 30 carried by the arms 9 of the draft bars 8. The sleeves are formed of strong metal and conform to the transverse contour of the arms 9 so that they fit snugly about the same as shown in Figures 4 and 5. Lugs or pinions 31 project inwardly from front ends of the forks and engage in circular openings 32 formed in the sleeves at opposite sides thereof. Therefore, the handle bars will be firmly held in pivotal engagement with the sleeves and the handle may be angularly adjusted to a position convenient for the operator of the implement or swung upwardly to an upright position in which the handle will remain when operation of the machine is temporarily stopped. A clip 33 formed from a strand of resilient wire fits about each sleeve with portions passing through slots 34 of the sleeves and engaging in selected ones of the notches 35 formed in the arms 9 of the draw bars 8. Crimped portions 36 of the wire strands impart added resiliency to the clips and also constitute finger holds by means of which the clips may be grasped and the sleeves shifted longitudinally if so desired. It is preferred to shift the sleeves along the arms 9 by pressure of the operator's foot and in order to do so there has been provided a plate 37 mounted between the handle bars 27 at a point close to the rim of the wheel 2. To shift the sleeves 30 on the on the draft bars 9, the operator may, after releasing the sleeves from the bars, and while holding the handle 26 in the position in which it is shown in Figure 1, apply upwardly directed blows to the kick plate 37 if an upward adjustment of the sleeves is to be made. If a downward adjustment of the sleeves 30 is to be made, the operator applies downwardly directed blows to the kick plate 37. This permits the operator of the implement to very easily shift the forward end of the handle upwardly or downwardly and since the point at which the handle is connected with the arms 9 of the frame controls the direction in which pressure is applied when forward thrust is exerted the depth to which the blades enter the ground during use of the machine may be controlled.

When the plow is in use the handle is grasped by the hand grips 38 carried by the outwardly bent upper or rear end portions 39 of the handle bars 27. These hand grips may be formed of wood, moulded plastic, or other suitable material.

The handle 26 may be connected to the inclined arms 9 of the frame 1 by means comprising loops fixed rigidly to the lower ends of the handle bars 27 and arranged in embracing relation to the inclined arms 9. This means also comprises bolts through the medium of which the loops are pivotally and adjustably connected to the inclined arms 9. One of the loops and bolts are shown in Figures 11 and 12. The loop 45 is of narrow elongated formation, and the bolt 46 is of U-form with legs of different lengths. The short leg 46ª of the bolt extends through openings 47 in the loop 45 and through a selected one of a series of openings 48 in the inclined arm 9. The long arm 46ᵇ of the bolt 46 extends through openings 49 in the loop 45 and is provided with a head 46ᶜ which prevents the bolt from being withdrawn entirely from the loop 45. The bolt 46 may be readily moved outwardly with respect to the loop 45 so as to free the loop for adjustment upwardly or downwardly on the inclined arm 9. To permit of this adjustment the series of openings 48 extend in the direction of the length of the inclined arm 9.

Having thus described the invention, what is claimed is:

1. An agricultural implement comprising a wheel, a blade carrying member having forwardly directed arms pivoted to the axle of the wheel, members mounted on the arms for adjustment thereon forwardly or rearwardly with relation to the pivot of the arms, means for securing said members in adjusted position on the arms, and a handle having bars, said bars bifurcated at their lower ends and connected to said members.

2. An agricultural implement comprising a wheel, an axle carried thereby at its center of rotation and about which the wheel rotates, a blade carrying means, draft bars connected to said blade carrying means and pivoted upon said axle, said draft bars having portions thereof inclined downwardly from and to the rear of said axle, a handle device and means adjustably securing said handle device to the inclined portions of said draft bars whereby adjustment of the handle device along the inclined portions of said draft bars will control the depth of penetration in the ground by the blades carried by the blade carrying means.

3. An agricultural implement of the type described in claim 2 wherein the means adjustably securing the handle device to the inclined portions of the draft bars include members secured to one end of the handle device and slidably mounted upon the inclined portions of the draft bars and a locking means insertable through said members and said inclined portions to lock the former relative to the latter at selective positions upon the same.

4. An agricultural implement of the type described in claim 2 wherein the means adjustably securing the handle device to the inclined portions of the draft bars include members pivotally secured to one end of the handle device and slidably mounted upon the inclined portions of the draft bars and a locking means insertable through said members and said inclined portions to lock the former relative to the latter at selective positions upon the same.

5. An agricultural implement of the type described in claim 2 wherein the means adjustably securing the handle device to the inclined portions of the draft bars include members secured to one end of the handle device and slidably mounted upon the inclined portions of the draft bars, each member having a pair of aligned apertures, a series of openings in the inclined portions of said draft bars, the apertures of each sleeve being adapted to be selectively placed in register with one of said openings, and substantially U-shaped locking means removably received in said apertures and one of said openings to lock said members to their respective inclined portions.

CHARLES M. KEARNS.

REFERENCES CITED

The following references are of record in the file of this patent:

UNITED STATES PATENTS

| Number | Name | Date |
|---|---|---|
| 507,819 | Keahey | Oct. 31, 1893 |
| 931,333 | Norcross | Aug. 17, 1909 |
| 1,425,372 | Dittemore | Aug. 8, 1922 |
| 1,309,851 | Alexander | July 15, 1919 |
| 544,124 | Rowlett | Aug. 6, 1895 |
| 1,348,096 | Dodd | July 27, 1920 |
| 304,578 | St. John | Sept. 2, 1884 |

FOREIGN PATENTS

| Number | Country | Date |
|---|---|---|
| 129,345 | German | July 25, 1932 |